United States Patent
Yamada et al.

(10) Patent No.: US 9,705,313 B2
(45) Date of Patent: Jul. 11, 2017

(54) THREE-LEVEL INVERTER EMPLOYING A BIDIRECTIONAL SWITCH, AND MODULAR STRUCTURE THEREFOR

(71) Applicant: FUJI ELECTRIC CO., LTD., Kawasaki-shi (JP)

(72) Inventors: Ryuji Yamada, Hachioji (JP); Koji Maruyama, Hino (JP); Takaaki Tanaka, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 49 days.

(21) Appl. No.: 14/877,318

(22) Filed: Oct. 7, 2015

(65) Prior Publication Data

US 2016/0028224 A1  Jan. 28, 2016

Related U.S. Application Data

(63) Continuation of application No. PCT/JP2013/076859, filed on Oct. 2, 2013.

(51) Int. Cl.
*H02M 7/5387* (2007.01)
*H02H 9/02* (2006.01)
(Continued)

(52) U.S. Cl.
CPC .............. *H02H 9/02* (2013.01); *H02M 7/487* (2013.01); *H02M 7/537* (2013.01); *H02M 3/156* (2013.01);
(Continued)

(58) Field of Classification Search
CPC ........................ H02M 7/5387; H02M 7/797
(Continued)

(56) References Cited

U.S. PATENT DOCUMENTS 7,440,300 B2 * 10/2008 Konishi .................... H02J 3/38
  323/222
7,639,515 B2 * 12/2009 Ponnaluri ............. H02M 7/487
  363/131
(Continued)

FOREIGN PATENT DOCUMENTS

DE  102009002332 A1  10/2010
EP     2413489 A1   2/2012
(Continued)

*Primary Examiner* — Jeffrey Sterrett
(74) *Attorney, Agent, or Firm* — Rabin & Berdo, P.C.

(57) ABSTRACT

A series circuit of capacitors and a series circuit of semiconductor switches such as SiC-MOSFETs are connected in parallel to a direct current power source, and one end of a bidirectional switch formed of semiconductor switches, such as IGBTs, and diodes, such as SiC-SBDs (Silicon Carbide Schottky Barrier Diodes), is connected to a series connection point (an M point) of the capacitors, while the other end of the bidirectional switch is connected to a series connection point of the semiconductor switches, in a three-level inverter that outputs three voltage levels by operating the semiconductor switches so as to satisfy at least one of the condition that the peak value of an alternating current output voltage $V_o$ is a value of 80% or more of the voltage of the capacitors and the condition that an output power factor is 0.8 or more.

14 Claims, 16 Drawing Sheets

(51) Int. Cl.
*H02M 7/487* (2007.01)
*H02M 7/537* (2006.01)
*H02M 3/156* (2006.01)
*H02M 1/00* (2006.01)

(52) U.S. Cl.
CPC .... *H02M 2001/007* (2013.01); *Y02B 70/1483* (2013.01)

(58) Field of Classification Search
USPC .................................................... 363/43, 132
See application file for complete search history.

(56) References Cited

U.S. PATENT DOCUMENTS

| | | | | |
|---|---|---|---|---|
| 8,564,982 B2* | 10/2013 | Song | ............ | H02M 1/4225 323/222 |
| 8,675,379 B2* | 3/2014 | Smolenski | ............ | H02M 7/003 363/132 |
| 8,861,240 B2* | 10/2014 | Yoshikawa | ............ | H02M 7/537 363/132 |
| 9,024,593 B2* | 5/2015 | Keller | ............ | H02M 7/48 323/222 |
| 2004/0246756 A1* | 12/2004 | Bijlenga | ............ | H02M 7/487 363/132 |
| 2009/0285005 A1* | 11/2009 | Gopfrich | ............ | H02J 3/38 363/132 |
| 2011/0116293 A1* | 5/2011 | Tabata | ............ | H02M 7/487 363/132 |
| 2012/0044728 A1* | 2/2012 | Yatsu | ............ | H02M 7/219 363/126 |
| 2012/0092915 A1* | 4/2012 | Okuda | ............ | H02M 7/487 363/132 |
| 2014/0247634 A1* | 9/2014 | Takizawa | ............ | H02M 1/32 363/132 |
| 2014/0321181 A1* | 10/2014 | Chen | ............ | H02M 7/487 363/132 |
| 2016/0028224 A1* | 1/2016 | Yamada | ............ | H02M 7/487 363/56.11 |

FOREIGN PATENT DOCUMENTS

| | | |
|---|---|---|
| EP | 2456059 A1 | 5/2012 |
| EP | 2662968 A1 | 11/2013 |
| EP | 2804307 A2 | 11/2014 |
| JP | 2010-252450 A | 11/2010 |
| JP | 2010-288415 A | 12/2010 |
| JP | 2013-021764 A | 1/2013 |
| JP | 2013-102674 A | 5/2013 |
| JP | 2013-116020 A | 6/2013 |
| JP | 5339018 B1 | 11/2013 |

* cited by examiner

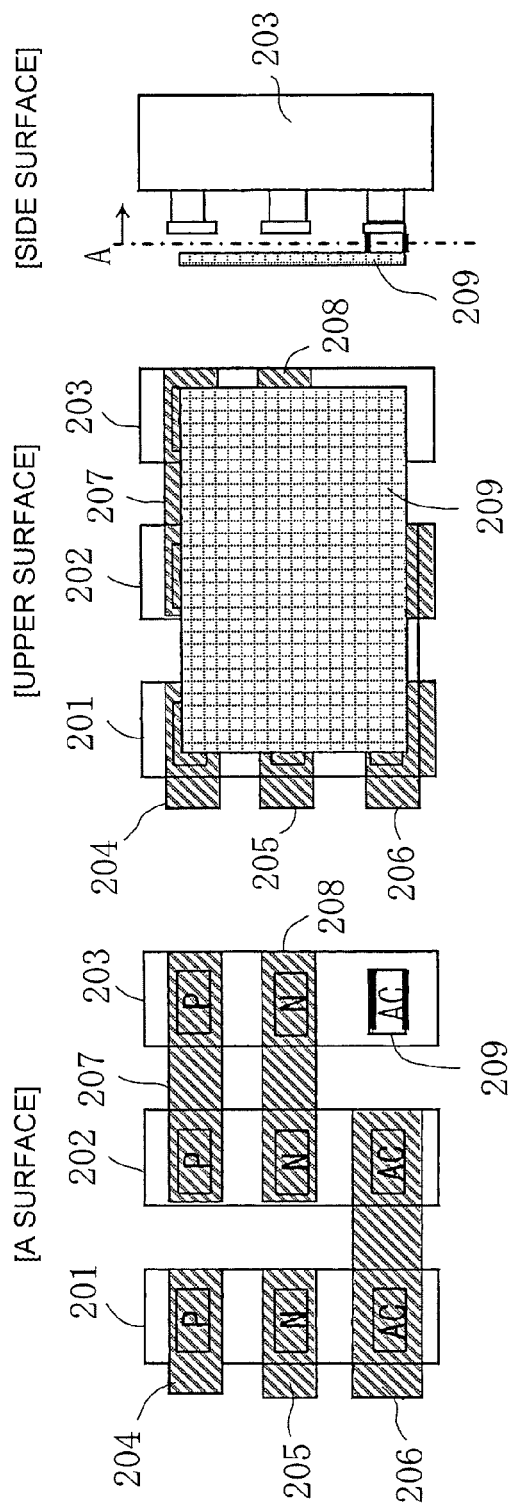

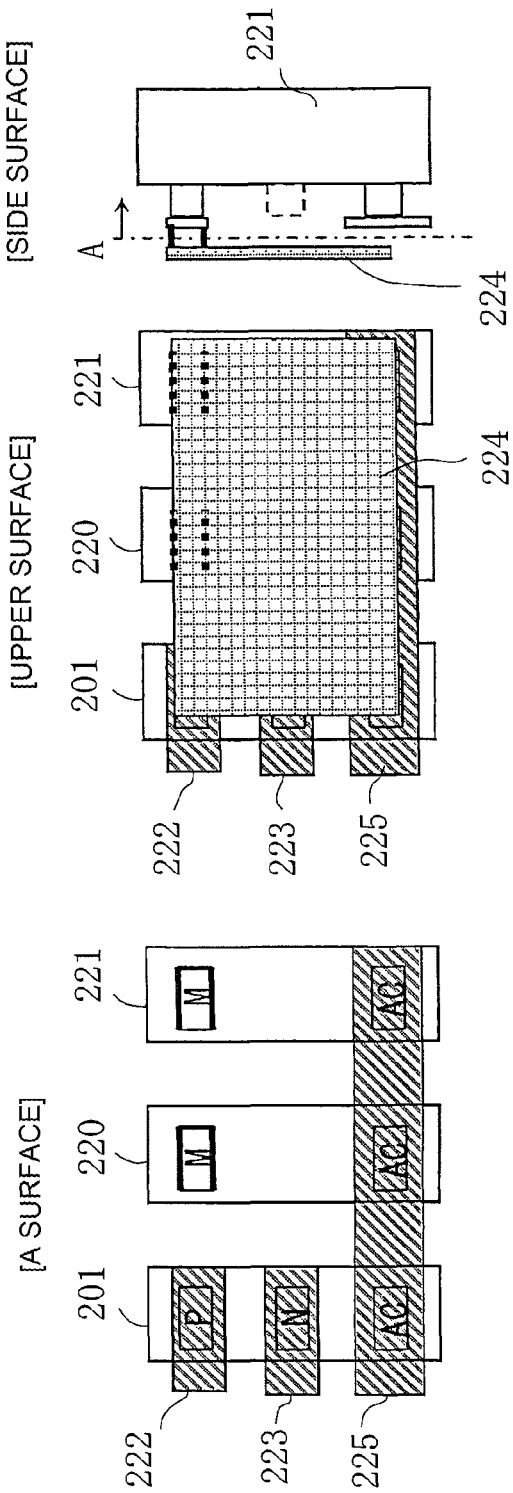

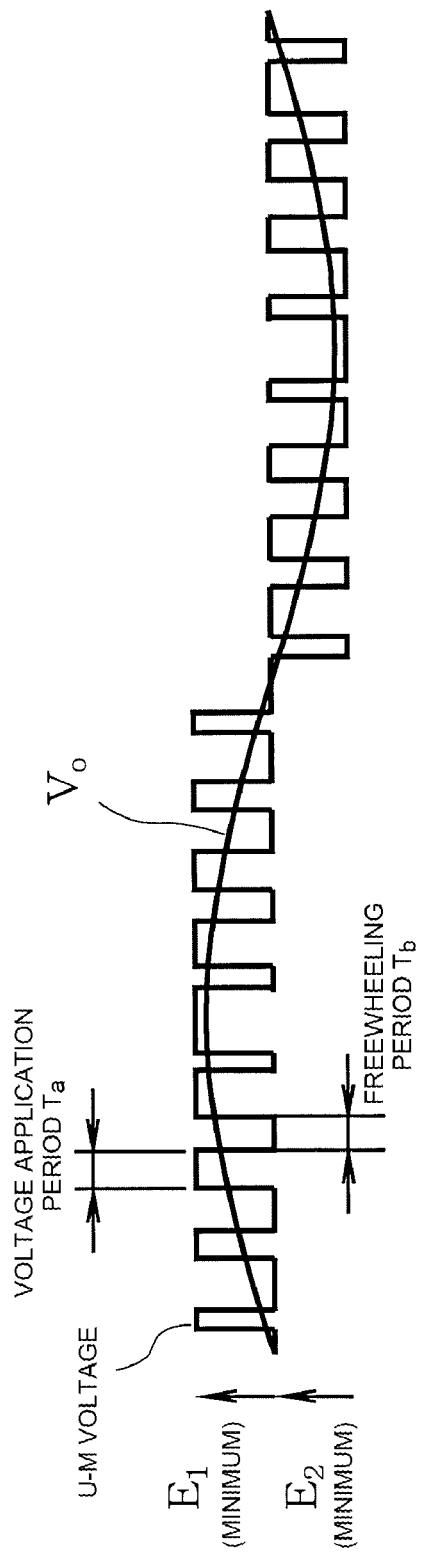

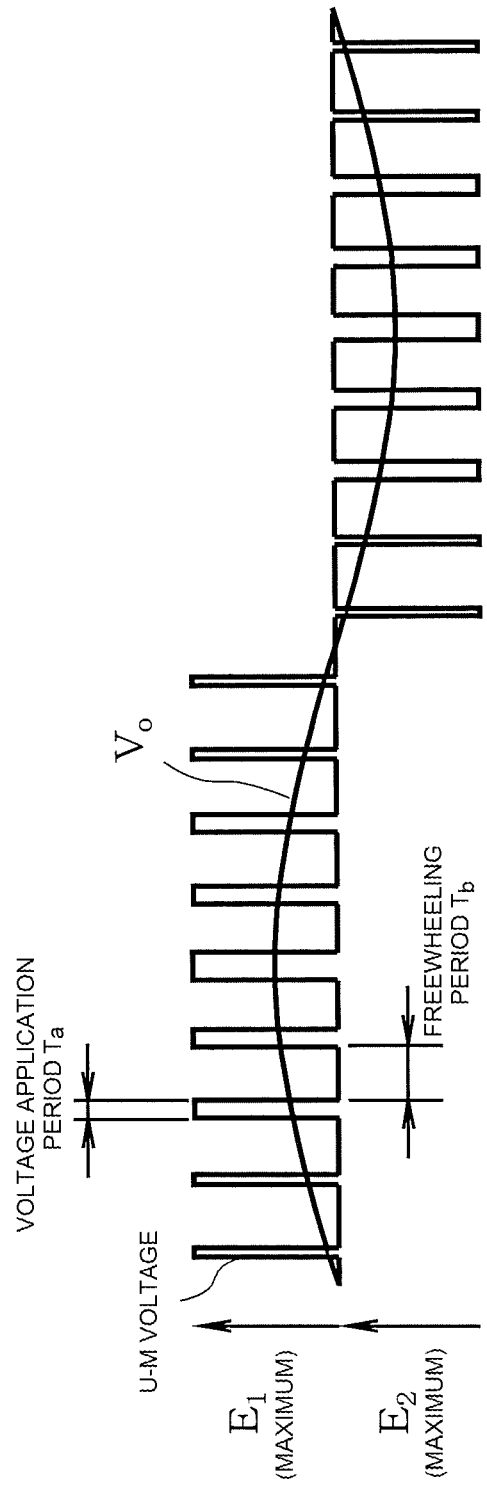

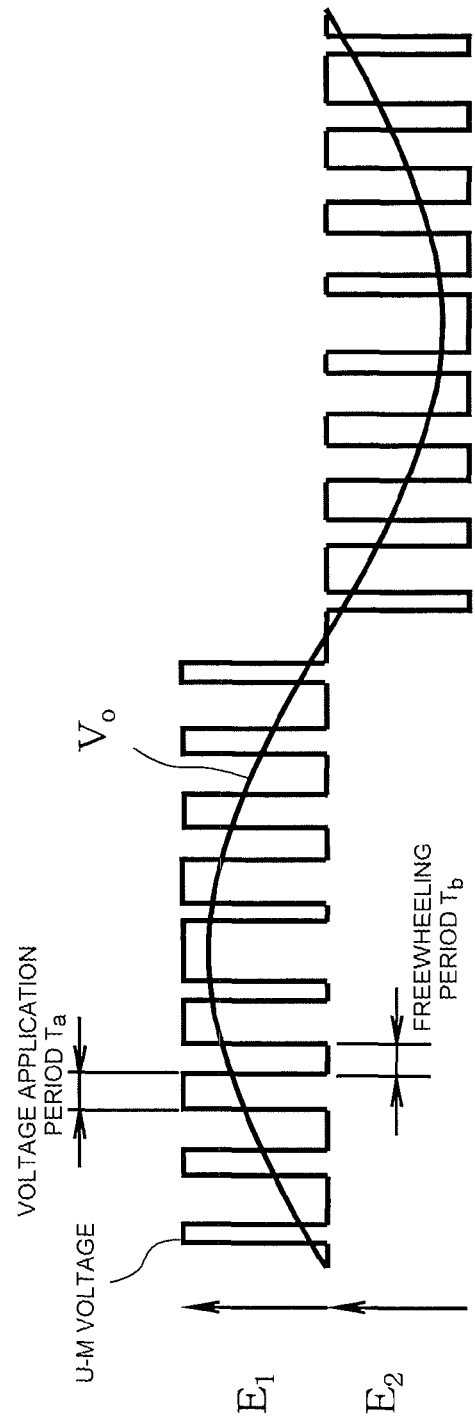

US 9,705,313 B2

THREE-LEVEL INVERTER EMPLOYING A BIDIRECTIONAL SWITCH, AND MODULAR STRUCTURE THEREFOR

CROSS-REFERENCE TO RELATED APPLICATIONS

The present application is a continuation of WO 2015/049743 A1, published Apr. 9, 2015, filed Oct. 2, 2013 as PCT/JP2013/076859, which is hereby incorporated by reference.

TECHNICAL FIELD

The present invention relates to a configuration of a three-level inverter which enables an improvement in power conversion efficiency and a reduction in the size and cost of a device.

BACKGROUND ART

FIGS. 6A and 6B show one phase of a circuit of a three-level inverter as disclosed in JP-A-2010-288415 (see particularly FIG. 3 in that reference, and the description thereof).

In FIGS. 6A and 6B, a direct current power source 1, may for example be a solar cell, and a voltage E thereof is divided into voltages $E_1$ and $E_2$ (normally, $E_1=E_2$) by capacitors 2 and 3 connected in series.

Semiconductor switches (hereafter also referred to simply as switches) 4 to 7, each formed of a MOSFET, can control a conduction/interruption of a forward current, and attain a conduction state always for a reverse current. The switches 6 and 7, connected in series in directions opposite to each other, configure a bidirectional switch which can control a conduction/interruption of both forward and reverse currents. Herein, the switches 4 and 5 are referred to as upper and lower arms, and a series circuit of the switches 6 and 7 as an intermediate arm, for the sake of convenience. An LC filter is configured of a reactor 8 and a capacitor 9, and the output terminals of the two ends of the capacitor 9 are interconnected to a power system 300 via a transformer 100.

A U point (an alternating current terminal) in FIGS. 6A and 6B attains the same potential as a P point by turning on the switch 4, an N point by turning on the switch 5, and an M point by turning on the switches 6 and 7 that configure a bidirectional switch. That is, the circuit can output three voltage levels by the switches 4 to 7 attaining an on-state, and has the characteristics that it is sufficient that the breakdown voltage of the switches 6 and 7 is ½ of that of the switches 4 and 5.

FIGS. 7A-7C show output voltage waveforms of the circuit, wherein an output voltage $V_o$ is controlled to form a sine wave by causing the pulse train of a U-M voltage having the three voltage levels to pass through the LC filter.

When using the circuit of FIGS. 6A and 6B as an interconnection inverter for solar power generation, the voltage E of the direct current power source (solar cell) 1 fluctuates greatly in accordance with environmental conditions.

Meanwhile, the alternating current output voltage $V_o$ is matched with a system voltage $V_s$ by the transformer 100. The system voltage $V_s$ fluctuates within a slight range, but is approximately constant, and as the transformer ratio of the transformer 100 is also constant unless a tap changing is carried out, it is necessary to keep the alternating current output voltage $V_o$ at a substantially constant value proportional to the system voltage $V_s$.

The circuit of FIGS. 6A and 6B is one kind of voltage inverter, and as the alternating current output voltage $V_o$ is controllable within a range in which the peak value thereof is equal to or less than a direct current input voltage, the positive peak of $V_o$ is equal to or less than $E_1$, and the negative peak is equal to or less than $E_2$, as shown in FIGS. 7A-7C.

Consequently, $V_o$ is taken to be a voltage which can be output even when $E_1$ and $E_2$ are minimum values within an operating range, and $V_o$ is kept constant by determining the transformer ratio of the transformer 100 based on the size of $V_o$, and by widening the pulse width of PWM control when $E_1$ and $E_2$ are low (FIG. 7A) and narrowing the pulse width when $E_1$ and $E_2$ are high (FIG. 7B).

FIGS. 8A and 8B show a phase relationship between the alternating current output voltage $V_o$ and a current I.

In the interconnection inverter for solar power generation, in order to supply power generated therein to the power system 300, a power factor 1 operation wherein the phase of the system voltage $V_s$, that is, the phase of the output voltage $V_o$ is approximately coincident with the phase of the output current I, as shown in FIG. 8A, is carried out, but there is also a case in which by deliberately injecting reactive power, a polarity non-coincidence period $T_c$ is created to reduce the power factor, as shown in FIG. 8B, thus carrying out a voltage adjustment at an interconnection point.

Current paths (1) to (4) shown in FIG. 6A previously described are in the cases of the power factor 1 in which the output voltage and the output current are coincident in polarity, wherein (1) and (3) are the paths in a voltage application period $T_a$ in FIGS. 7A-7C, and (2) and (4) are the paths in a freewheeling period $T_b$.

When a direct current voltage is low, as in FIG. 7A, a time ratio at which the switch 4 or 5 conducts is high, and a conduction loss ratio in the upper and lower arms is high, in particular, in the vicinity of the peak of $V_o$. When the direct current voltage is high, as shown in FIG. 7B, a time ratio at which the switch 6 or 7 conducts is high, and a conduction loss ratio in the intermediate arm is high. When the direct current voltage is set so as to be always high using a voltage fluctuation compensation circuit to be described hereafter, as shown in FIG. 7C, a conduction loss ratio in the upper and lower arms is high in the same way as in FIG. 7A.

A shift from the path (1) to (2) in FIG. 6A is carried out by turning off the switch 4. Also, a shift from the path (2) to (1) is carried out by turning on the gate of the switch 7, turning off the gate of the switch 6 in advance, and after blocking a short circuit current in a path from the switch 4 through the switch 6 (the main body portion of the MOSFET) to the switch 7, turning on the gate of the switch 4. With the turning on of the switch 4, a reverse parallel diode of the switch 6 interrupts a current by reverse recovery. Shifts from the path (3) to (4) and from (4) to (3) are the same as above because the pairs of shifts are symmetrical operations. Consequently, in FIG. 6A, the switch 4 or 5 generates a turn-on loss or a turn-off loss, and the switch 6 or 7 generates a reverse recovery loss.

Meanwhile, paths (5) to (8) shown in FIG. 6B are in a case in which the output voltage and the output current are not coincident in polarity, wherein (5) and (7) are the paths in the voltage application period $T_a$ in FIGS. 7A-7C, and (6) and (8) are the paths in the freewheeling period $T_b$. Without going into detail, in FIG. 6B, the switch 6 or 7 generates a turn-on loss and a turn-off loss, and the switch 4 or 5 generates a reverse recovery loss.

As in the above, in this heretofore known technology, the ratio of conduction losses, and the contents of switching losses, generated by respective semiconductor switches vary depending on operating conditions.

SUMMARY OF INVENTION

Technical Problem

As a semiconductor switch which is applied in the circuit of FIGS. 6A and 6B, in recent years, a semiconductor switching element, such as a MOSFET made of SiC (silicon carbide) (hereafter referred to as a SiC-MOSFET), which can operate fast is being put into practical use. This kind of new type element also has the advantages that a fast switching is possible, a conduction loss is low for forward and reverse currents, it is possible to reduce the size of the LC filter by setting a switching frequency to be high, and the like, compared with a heretofore known IGBT (insulated gate bipolar transistor) made of silicon.

However, a new type element such as a SiC-MOSFET has the problem that it is expensive compared with a heretofore known product and that the use of this kind of new type element for all the switches 4 to 7 leads to an increase in the cost of a device.

Therefore, a problem to be solved by the invention is to provide a three-level inverter which enables an increase in efficiency and a reduction in size while reducing cost by utilizing heretofore known inexpensive elements for one portion of semiconductor switches.

In order to solve the heretofore described problem, in a non-limiting embodiment, the invention is a three-level inverter including:
  a first semiconductor switch and second semiconductor switch which can control a conduction/interruption of a forward current by applying an on-signal or an off-signal to a control terminal, and which attain a conduction state always for a reverse current, wherein
  a series circuit of a first capacitor and second capacitor and a series circuit of the first semiconductor switch and second semiconductor switch are connected in parallel to a direct current power source, wherein
  one end of a bidirectional switch which can control a conduction/interruption of both forward and reverse currents is connected to a series connection point of the first capacitor and second capacitor, and the other end of the bidirectional switch is connected to a series connection point of the first semiconductor switch and second semiconductor switch, wherein
  the bidirectional switch has:
  a third semiconductor switch and fourth semiconductor switch which can control a conduction/interruption of a forward current by applying an on-signal or an off signal to a control terminal, and which attain one of a conduction state always for a reverse current, an interruption state always for the reverse current, or a non-conduction state having no breakdown voltage; a first diode connected in series to the third semiconductor switch; and a second diode connected in series to the fourth semiconductor switch, the bidirectional switch being configured by connecting a series circuit of the third semiconductor switch and first diode, and a series circuit of the fourth semiconductor switch and second diode, in parallel in opposite directions, and wherein
  the three-level inverter can output three voltage levels by operating the first to fourth semiconductor switches, the three-level inverter being operated so as to satisfy at least one of the condition that the peak value of an alternating current output voltage is a value of 80% or more of the voltage of the first capacitor or second capacitor and the condition that an output power factor is 0.8 or more.

In another aspect of the invention, the three-level inverter as described above is such that the first semiconductor switch and the second semiconductor switch are each configured of a semiconductor switching element made of SiC (silicon carbide), or are each configured of a reverse parallel circuit of a semiconductor switching element made of SiC and a Schottky barrier diode made of SiC (a SiC-SBD).

In yet another aspect of the invention, IGBTs or MOSFETs made of silicon are used as the third semiconductor switch and fourth semiconductor switch, and diodes whose reverse recovery time is equal to or shorter than a switching time of the first semiconductor switch or second semiconductor switch are used as the first diode and second diode.

In yet another aspect of the invention, the first diode and the second diode are SiC-SBDs.

In a further aspect of the invention, the three-level inverter as described above includes, between the direct current power source and the series circuit of the first capacitor and second capacitor, a voltage fluctuation compensation circuit which, when there is a voltage fluctuation in the direct current power source, stabilizes a voltage across the series circuit by compensating for the voltage fluctuation of the direct current power source.

In yet another aspect of the invention, the three-level inverter as described above may be such that the first semiconductor switch and the second semiconductor switch are housed in a first module, the third semiconductor switch and the fourth semiconductor switch are housed in a second module, and the first diode and the second diode are housed in a third module, and that the first to third modules are connected by a conductor bar of a low inductance.

In yet another aspect of the invention, the three-level inverter as described above may be such that the first semiconductor switch and the second semiconductor switch are housed in a first module, and the third semiconductor switch, the first diode, the fourth semiconductor switch, and the second diode are housed in a fourth module, and that the first module and the fourth module are connected by a conductor bar of a low inductance.

In yet another aspect of the invention, the three-level inverter as described above may be such that the first semiconductor switch and the second semiconductor switch are housed in a first module, the third semiconductor switch and the first diode are housed in a fifth module, and the fourth semiconductor switch and the second diode are housed in a sixth module, and that the first, fifth and sixth modules are connected by a conductor bar of a low inductance.

According to the invention, even when heretofore known inexpensive elements are used for half of the semiconductor switches configuring the three-level inverter, it is possible to obtain efficiency substantially equal to that when new type elements are used for all the semiconductor switches, and there is no possibility of causing a reduction in power conversion efficiency or an increase in the size of the device, either, as a result of this.

BRIEF DESCRIPTION OF DRAWINGS

FIGS. 5A-5C give illustrations of layout and wiring structures using the modules of FIGS. 4A-4F.

FIGS. 7A-7C give waveform diagrams of a U-M voltage and alternating current output voltage of the circuit of FIGS. 6A and 6B.

DESCRIPTION OF EMBODIMENTS

Hereafter, a description will be given, according to the drawings, of embodiments of the invention.

Figure 1:
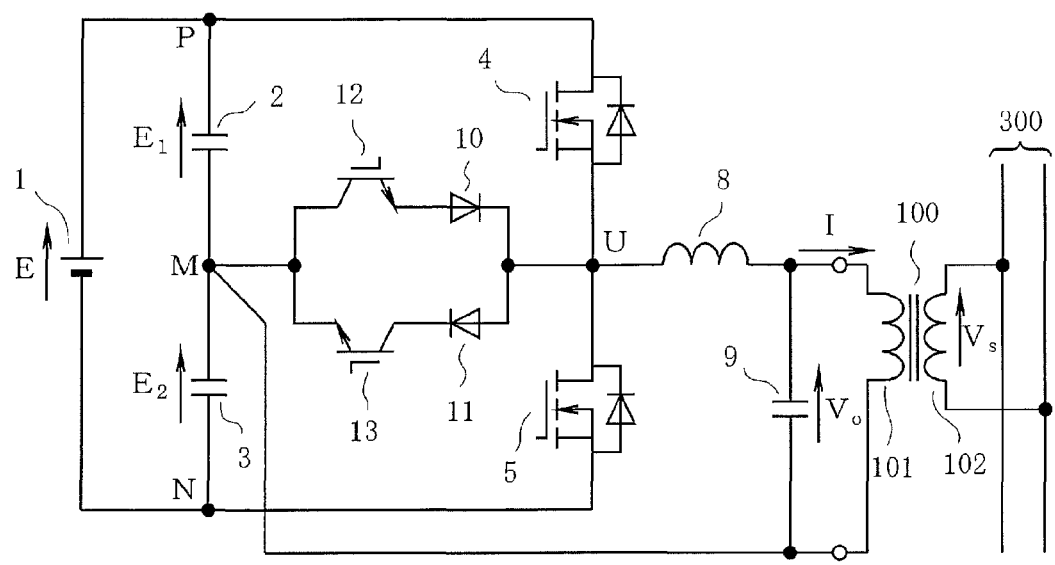
FIG. 1 is a circuit diagram showing a first embodiment of the invention.

FIG. 1 is a circuit diagram showing a first embodiment of the invention. In FIG. 1, a series circuit of a first capacitor 2 and second capacitor 3 (the respective voltages of the two capacitors are taken as $E_1=E_2$) and a series circuit of a first semiconductor switch 4 and second semiconductor switch 5 such as SiC-MOSFETs, which can operate fast, are connected in parallel to a direct current power source 1 (the voltage is taken as E) such as a solar cell. The series circuit of the semiconductor switches 4 and 5 is referred to as upper and lower arms in the same way as in FIGS. 6A and 6B.

Also, hereafter, signs 4 and 5 will be described as being MOSFETs.

A series circuit of a reactor 8 and capacitor 9, configuring an LC filter, is connected between a series connection point (a U point) of the MOSFETs 4 and 5 and a series connection point (an M point) of the capacitors 2 and 3, and a primary winding 101 of a transformer 100 is connected across the capacitor 9. Also, a secondary winding 102 of the transformer 100 is connected to a power system 300.

A series circuit of a third semiconductor switch 12 and first diode 10 and a series circuit of a fourth semiconductor switch 13 and second diode 11 are connected in parallel to each other between the M point and the U point, and an intermediate arm is configured of the semiconductor switches 12 and 13 and diodes 10 and 11. Herein, the semiconductor switches 12 and 13 are elements which can control a conduction/interruption of a forward current and do not depend on any characteristics upon a reverse current, and IGBTs made of, for example, silicon are used as the elements. Hereafter, signs 12 and 13 will be described as being IGBTs.

The diodes 10 and 11 are fast diodes, having a low reverse recovery loss, whose reverse recovery time is equal to or shorter than a switching time of the semiconductor switch 4 or semiconductor switch 5, and for example, SiC-SBDs (Silicon Carbide Schottky Barrier Diodes) can be used as the diodes. Of course, the diodes 10 and 11 do not have to be SiC-SBDs as long as they are fast diodes having a low reverse recovery loss.

Herein, the circuit of FIG. 1 is of a configuration such as to output a single-phase alternating current voltage, but may be configured in such a way as to output a three-phase alternating current voltage by connecting three phases of upper and lower arms formed of the respective semiconductor switches 4 and 5 in parallel and connecting the intermediate arms, each formed of the semiconductor switches 12 and 13, between the series connection point of the semiconductor switches 4 and 5 of the respective upper and lower arms and the M point.

As applicable conditions of the circuit, it is supposed that the voltage fluctuation range of the direct current power source 1 can be reduced by some means, and consequently, that the rated value of an alternating current output voltage $V_o$ does not have to be set to be small taking into account a drop in direct current voltage. In this case, it is supposed that the circuit is operated with the peak value of the alternating current output voltage $V_o$ set so as to be 80[%] or more of the direct current $E_1$ or $E_2$, wherein the fluctuation range of the direct current voltage is taken as 10[%] or less, and an amount reduced due to the upper limit of the pulse width at the U point and to a drop in voltage in the circuit is taken as 10[%] or less.

The U-M voltage and alternating current output voltage $V_o$ at this time are as shown in FIG. 7C previously described, and a freewheeling period $T_b$, in which the intermediate arm conducts, becomes significantly shorter than in FIG. 7B. Herein, two elements' worth of forward voltage drop occurs when the intermediate arm is configured of a series circuit of IGBTs and diodes, as shown in FIG. 1. The same situation also applies in the circuit of FIGS. 6A and 6B, and as the intermediate arm exhibits low resistance characteristics in both forward and reverse directions when using SiC-MOSFETs in the intermediate arm, it is possible to reduce the forward voltage drop by increasing the number of parallel connections.

Meanwhile, an IGBT and a diode are such that as forward voltage drop characteristics have a current-independent constant voltage component, there is a limit on the reduction in the forward voltage drop even though the number of parallel connections is increased. Consequently, as far as in conduction losses in the intermediate arm at the same current, the conduction loss is higher in FIG. 1 than in FIGS. 6A and 6B.

However, in the circuit configuration of FIG. 1, it is possible to reduce the effect of an increase in the conduction loss on the whole loss by lowering the time ratio of the freewheeling period $T_b$ in which the intermediate arm conducts, as heretofore described.

This advantage becomes more significant when an output power factor is set so as to be 1 or a value close to 1, for example, 0.8 or more. When the output power factor is 1 or a value close to 1 in this way, a period in FIGS. 7A-7C, in which a voltage application period $T_a$ increases, and a period, in which the instantaneous value of an output current increases, are approximately coincident. Conversely, as it is in the vicinity of zero crossing, in which the instantaneous value of the current is small, that the period in which the intermediate arm conducts increases, an increase in the whole loss decreases even though the forward voltage drop increases at that time.

Next, a description will be given of a switching loss on the condition that the output power factor is high.

Figure 6A:
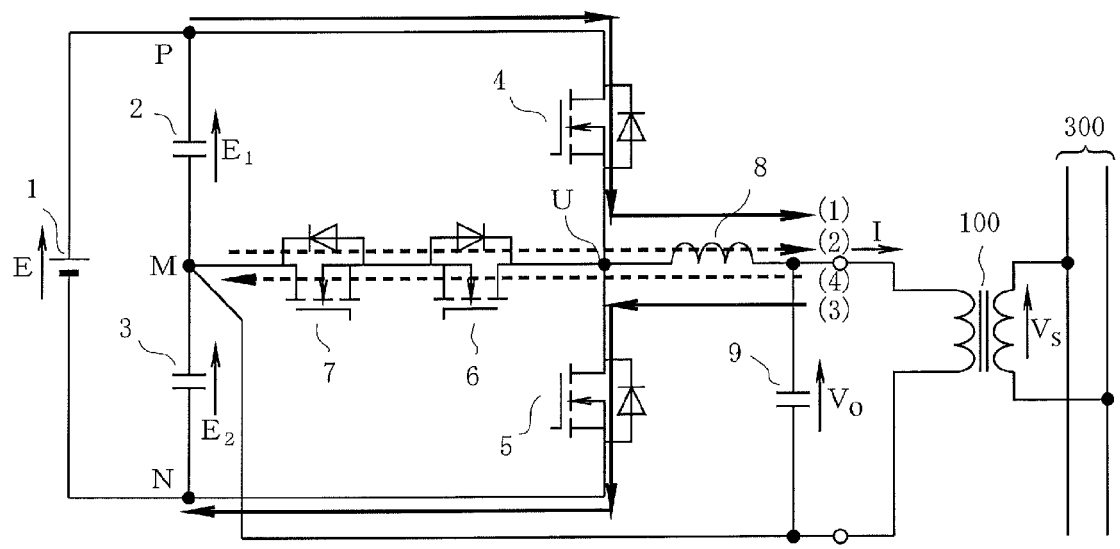
FIGS. 6A and 6B are circuit diagrams of one phase of a three-level inverter as disclosed in JP-A-2010-288415.

In a period in which the output voltage and the output current are coincident in polarity, the upper and lower arms generate a turn-on loss and a turn-off loss, and the intermediate arm generates a reverse recovery loss, as a result of the same operation as in FIG. 6A previously described. In this embodiment, as fast elements such as SiC-MOSFETs are used for the upper and lower arms, that is, the semiconductor switches 4 and 5, and fast elements such as SiC-SBDs are used for the diodes 10 and 11 of the intermediate arm, all the respective losses of the upper and lower arms and intermediate arm decrease.

Figure 6B:
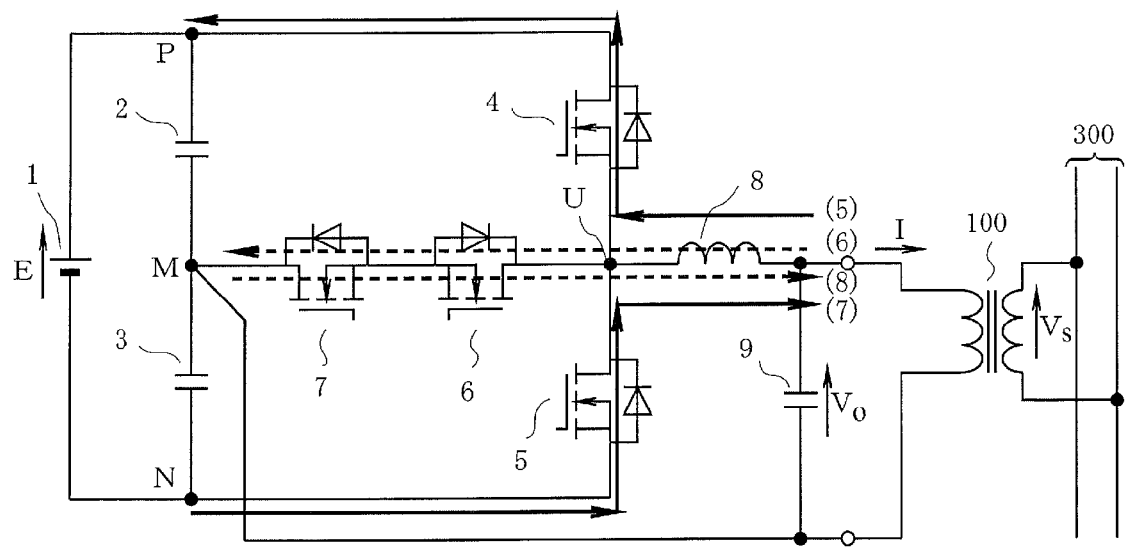
Figure 8A:
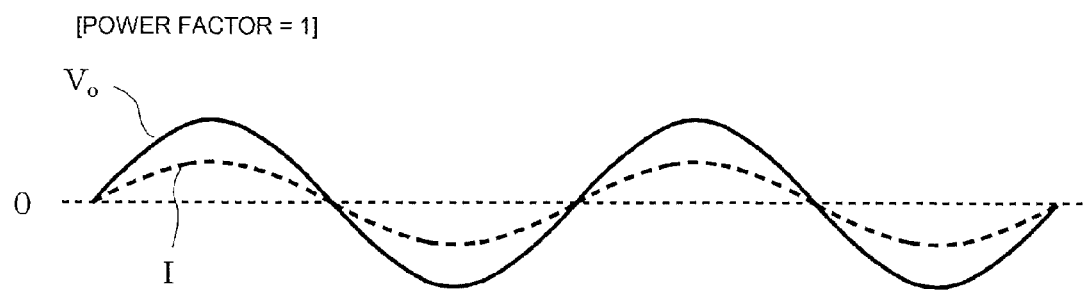
FIGS. 8A and 8B give waveform diagrams showing a phase relationship between an alternating current output voltage and current of the circuit of FIGS. 6A and 6B.
Figure 8B:
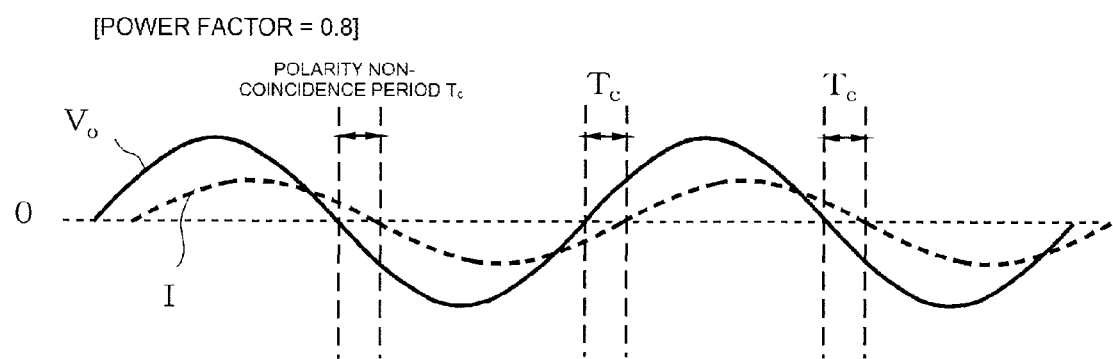
Figure 9A:
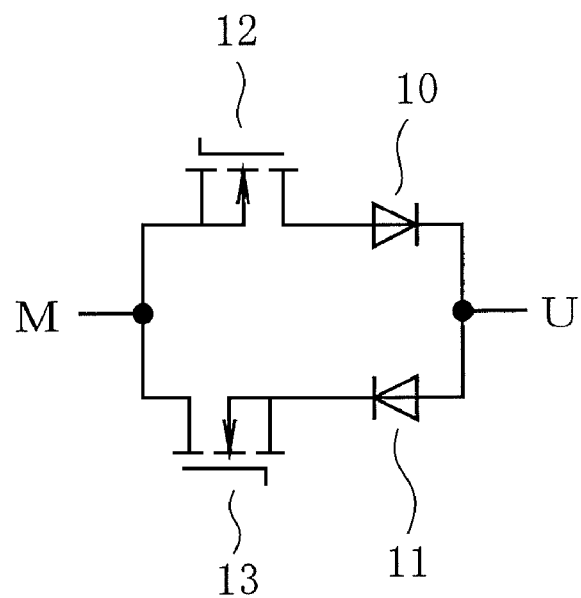
FIG. 9A illustrates the use of MOSFETS in the bidirectional switch and FIG. 9B illustrates the use of Schottky diodes in the bidirectional switch.
Figure 9B:
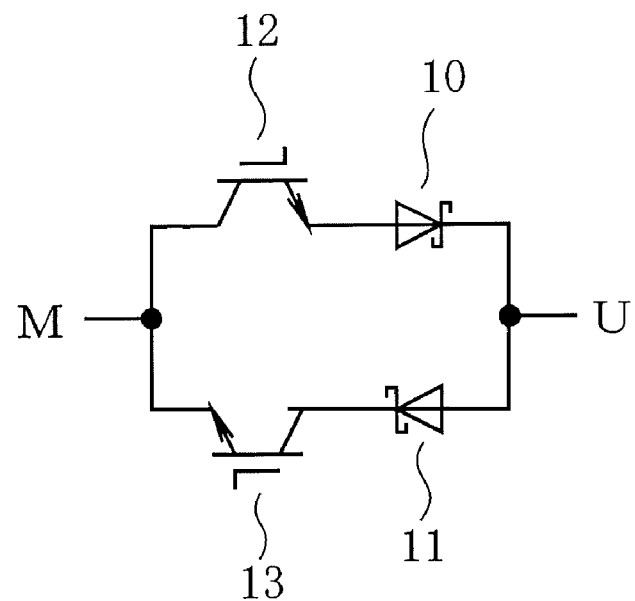

In a period in which the output voltage and the output current are not coincident in polarity, the IGBTs 12 and 13 of the intermediate arm generate a turn-on loss and a turn-off loss as a result of the same operation as in FIG. 6B previously described. The losses are higher than those generated by the SiC-MOSFETs, but a polarity non-coincidence period $T_c$ is short, and furthermore, in the period $T_c$, as the instantaneous value of an output current I is comparatively small, it is natural that there is a small effect on the whole loss.

As above, it is possible, on the conditions that the peak of the alternating current output voltage $V_o$ is close to the direct current voltage and that the output power factor is high, to replace half (in the example of FIG. 1, two of the four) of the semiconductor switches in the circuit with heretofore known inexpensive elements, such as IGBTs, substantially without increasing the losses.

It is also possible, from the same principle, to further reduce cost by replacing the reverse parallel diode of the MOSFET 4 or 5 with an element which is inferior in reverse recovery characteristics but inexpensive.

Next, a description will be given, based on FIG. 2, of a second embodiment of the invention.

In the second embodiment, in order to realize the condition that a direct current input voltage fluctuation of an inverter is small, regardless of the characteristics of an actual direct current power source 1 such as a solar cell, a voltage fluctuation compensation circuit 20 is connected between the direct current power source 1 and the series circuit of the capacitors 2 and 3.

Figure 2:
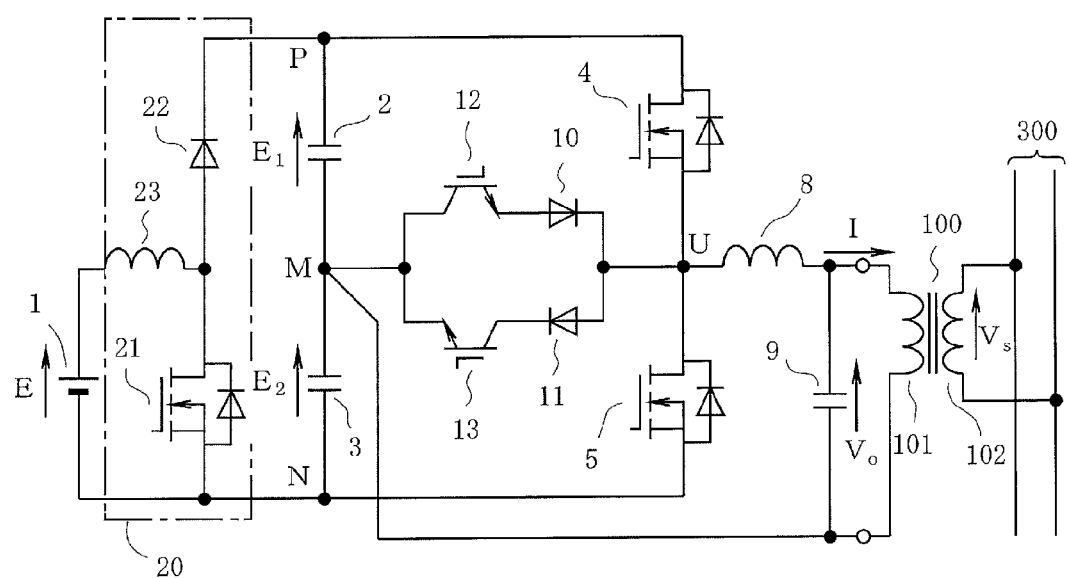
FIG. 2 is a circuit diagram showing a second embodiment of the invention.

In the voltage fluctuation compensation circuit 20 of FIG. 2, semiconductor switch 21 may be formed of, for example, a MOSFET, 22 a diode 22 is connected in series to the semiconductor switch 21, and a reactor 23 is connected between the positive electrode of the direct current power source 1 and the anode of the diode 22. The voltage fluctuation compensation circuit 20 configures a known DC/DC converter circuit called a boost chopper, wherein a P-N direct current voltage can be kept at a constant value by a switching operation of the semiconductor switch 21 even when there is a voltage fluctuation in the direct current power source 1.

The voltage fluctuation compensation circuit in this embodiment may be of any configuration as long as the circuit is a circuit which can always output a constant direct current voltage even though a direct current source voltage fluctuates.

Figure 3A:
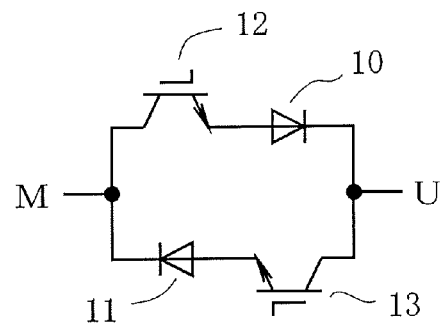
FIGS. 3A-3C give circuit diagrams showing configuration examples of an intermediate arm of each embodiment.
Figure 3B:
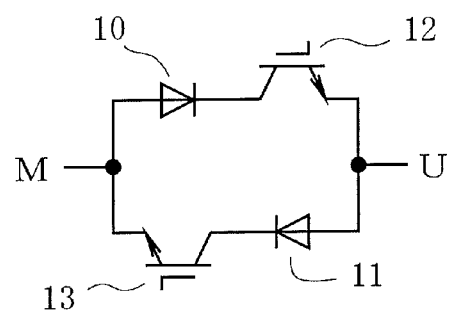
Figure 3C:
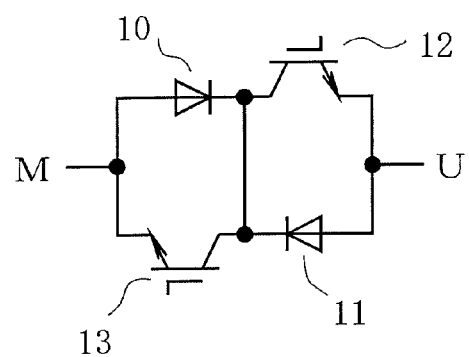

The intermediate arm may be of configurations such as shown in FIGS. 3A-C other than the configuration wherein a series connection point of the IGBTs 12 and 13 is connected to the M point, and a series connection point of the diodes 10 and 11 is connected to the U point, as shown in FIGS. 1 and 2.

FIG. 3A is a configuration wherein a connection point of the collector of the IGBT 12 and the cathode of the diode 11 is connected to the M point, and a connection point of the collector of the IGBT 13 and the cathode of the diode 10 is connected to the U point, and FIG. 3B is a configuration wherein a connection point of the emitter of the IGBT 13 and the anode of the diode 10 is connected to the M point, and a connection point of the emitter of the IGBT 12 and the anode of the diode 11 is connected to the U point.

Also, as shown in FIG. 3C, the collectors of the IGBTs 12 and 13 in FIG. 3B may be connected together. FIG. 3C is a configuration wherein the diodes 10 and 11 are combined into a reverse parallel diode for reverse voltage protection as protection means of the IGBTs 12 and 13 having no reverse breakdown voltage.

In the first embodiment and second embodiment, three semiconductor elements of different kinds exist in series in a direct current circle current path, such as from the MOSFET 4 through the diode 10 to the IGBT 12 in FIG. 1. Meanwhile, in a circuit using an element which switches fast, as a current change rate (di/dt) of the element is high, a surge voltage is generated due to an inductance existing on the circuit, and an application of an overvoltage to the element frequently becomes a problem. In order to prevent the problem, it is necessary to minimize the inductance of the heretofore described kind of direct current circle current path.

Meanwhile, a semiconductor switching element dealing with a large current is often housed in a block-shaped module having a wiring terminal and an insulating case.

FIGS. 4A-4F give configuration diagrams wherein the semiconductor switches and diodes used in the circuit of FIGS. 1 and 2 are modularized.

Figure 4A:
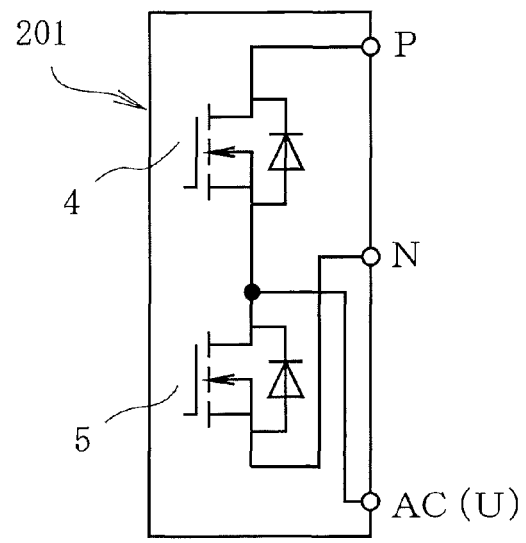
FIGS. 4A-4F give configuration diagrams wherein semiconductor switches and diodes in each embodiment are modularized.
Figure 4B:
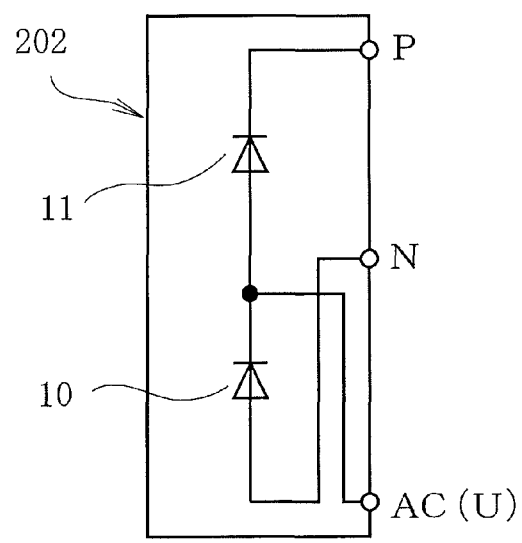
Figure 4C:
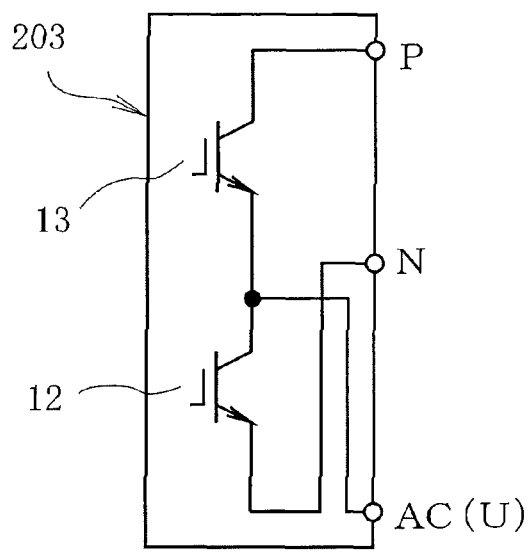
Figure 4D:
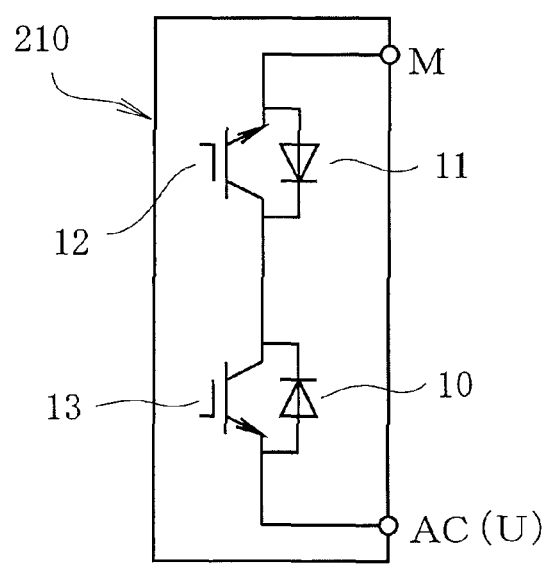

FIG. 4A is a first module 201 in which are housed the MOSFETs 4 and 5 of the upper and lower arms, FIG. 4B is a second module 202 in which is housed a diode portion (the diodes 10 and 11) of the intermediate arm, and FIG. 4C is a third module 203 in which is housed an IGBT portion (the IGBTs 12 and 13) of the intermediate arm. The modules 202 and 203 shown in FIG. 4B and FIG. 4C are used by connecting a P point, N point, and AC (U) point of one module to respective P, N, and AC (U) points of the other. Also, FIG. 4D is a fourth module 210 in which the diodes 10 and 11 and IGBTs 12 and 13 of the intermediate arm are collectively housed, and corresponds to the previously described circuit of FIG. 3C.

Figure 4E:
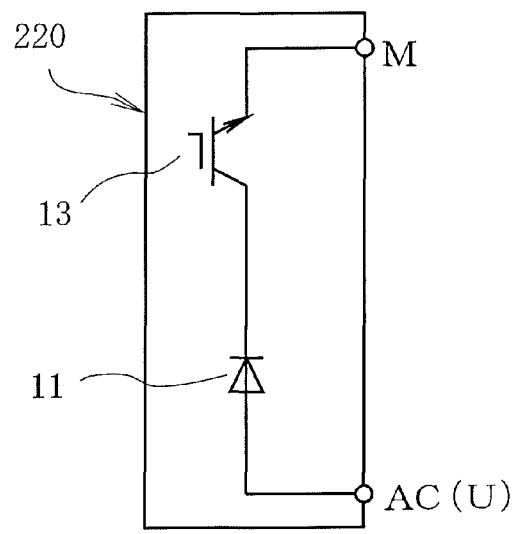
Figure 4F:
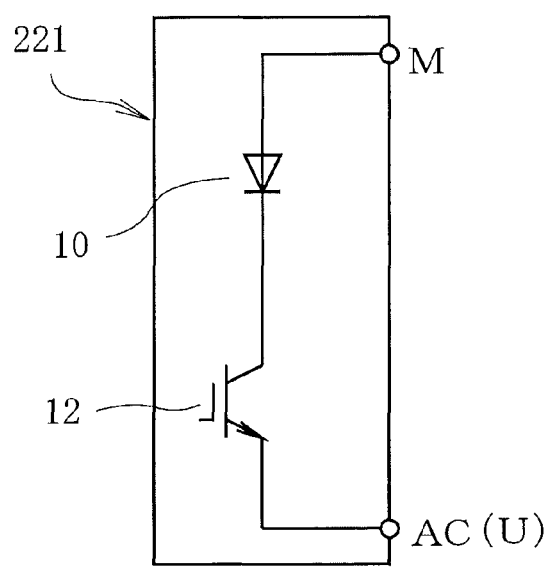

Furthermore, FIGS. 4E and 4F are examples in which the IGBT 13 and diode 11 configuring the intermediate arm are housed in a fifth module 220, and in the same way, the IGBT 12 and diode 10 are housed in a sixth module 221.

Next, FIG. 5A shows layout and wiring structures using the modules 201, 202, and 203 in FIGS. 4A-4C. The first module 201 for the upper and lower arms, the second module 202 of the diode portion, and the third module 203 of the IGBT portion are all formed in the same shape.

In FIG. 5A, 204 is a wiring bar connected to the P point, 205 is a wiring bar connected to the N point, and 206 is a wiring bar connected to the U point. 207 is a wiring bar corresponding to a connection point of the diode 11 and IGBT 13 of the intermediate arm, 208 is a wiring bar corresponding to a connection point of the diode 10 and IGBT 12 of the intermediate arm, and 209 is a wiring bar corresponding to the potential of the M point.

In the layout and wiring structures, a current flowing by way of the U point from the P and N points is covered with the M point potential on the way back. It is well known that when the wiring bars are disposed in parallel, magnetic fluxes generated by a current which flows forward and backward in opposite directions are cancelled out, thus reducing the inductance, and the structure in FIG. 5A is for realizing this. This kind of structure has the advantage that a module of a commonly used configuration can be directly used in two-level circuits such as shown in FIGS. 4A-4C.

Figure 5B:
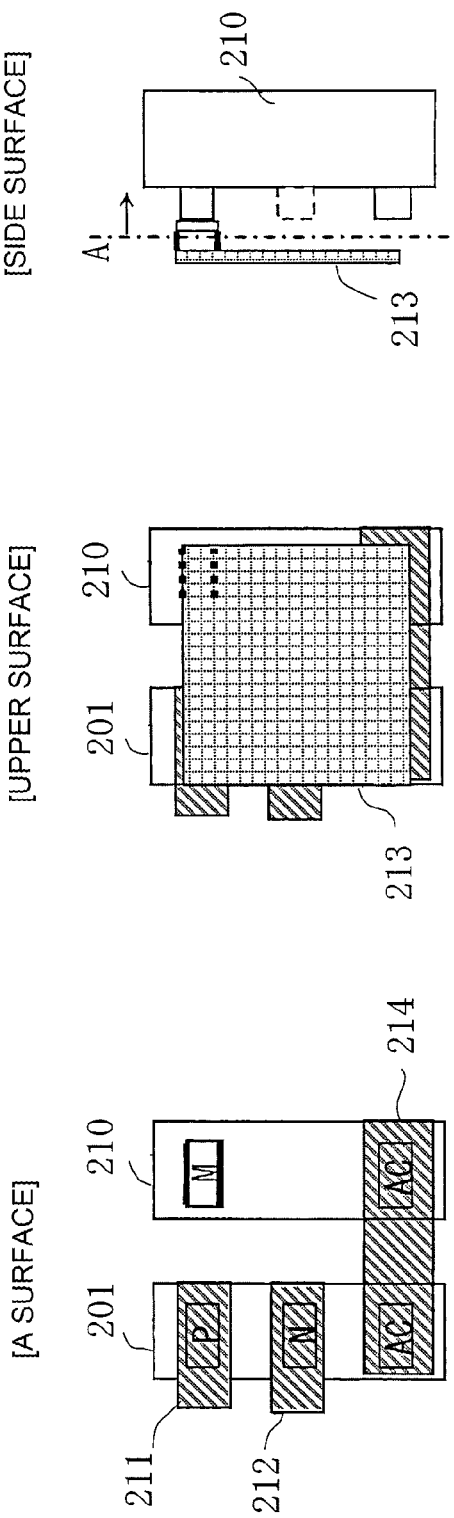

Also, FIG. 5B shows a layout and wiring structure using the modules 201 and 210 in FIGS. 4A and 4D, wherein 211 is a wiring bar connected to the P point, 212 is a wiring bar connected to the N point, 213 is a wiring bar connected to the M point, and 214 is a wiring bar connected to the U point. The wiring bar 213 and the other wiring bars 211, 212, and 214 are disposed so as to overlap with each other in parallel on the modules 201 and 210. According to the structure, there is the advantage of it being possible to shorten the distance of a circle circuit compared with in FIG. 5A.

FIG. 5C shows a layout and wiring structure using the modules 201, 220 and 221, wherein 222 is a wiring bar connected to the P point, 223 is a wiring bar connected to the N point, 224 is a wiring bar connected to the M point, and 225 is a wiring bar connected to the U point. The wiring bar 224 and the other wiring bars 222, 223, and 225 are disposed so as to overlap with each other in parallel on the modules 201, 220, and 221.

The configuration of the modules and the shape of the wiring bars are not limited to those heretofore described. Other features of the invention may also be practiced otherwise than as specifically described herein without departing from the scope of the invention.

The invention claimed is:

1. A three-level inverter, comprising:
a first series circuit of a first semiconductor switch and a second semiconductor switch configured to control conduction/interruption of forward current when an on-signal or an off-signal is applied to a control terminal thereof, and which attain a conduction state for a reverse current, the first and second semiconductor switches of the first series circuit being connected together at a first series connection point, and connected in parallel to a direct current power source;
a second series circuit of a first capacitor and a second capacitor connected together at a second series connection point, and connected in parallel to the first series circuit, the second series circuit being connected in parallel to the direct current power source;
a bidirectional switch configured to control conduction/interruption of both forward and reverse currents, a first end thereof being connected to the first series connection point, a second end thereof being connected to the second series connection point, the bidirectional switch further including:
a third semiconductor switch and a fourth semiconductor switch configured to control conduction/interruption of forward current when an on-signal or an off signal is applied to a control terminal thereof, and which attain one of a conduction state always for a reverse current, an interruption state always for the reverse current, and a non-conduction state having no breakdown voltage;
a first diode connected in series with the third semiconductor switch; and
a second diode connected in series with the fourth semiconductor switch,
the bidirectional switch including a series circuit of the third semiconductor switch and the first diode, and a series circuit of the fourth semiconductor switch and second diode, connected together in parallel in opposite directions,
wherein
the three-level inverter outputs three voltage levels by operating the first to fourth semiconductor switches, and
the peak value of an alternating current output voltage is a value of 80% or more of the voltage of the first capacitor or second capacitor,
wherein
the third semiconductor switch and the fourth semiconductor switch are IGBTs or MOSFETs made of silicon, and
the first diode and the second diode have a reverse recovery time equal to or shorter than a switching time of the first semiconductor switch and the second semiconductor switch.

2. The three-level inverter according to claim 1, wherein the first semiconductor switch and the second semiconductor switch each include a semiconductor switching element made of silicon carbide, or each include a reverse parallel circuit of a semiconductor switching element made of silicon carbide and a Schottky barrier diode made of silicon carbide.

3. The three-level inverter according to claim 1, further including
three modules, including
one module housing the first semiconductor switch and the second semiconductor switch,
another module housing the third semiconductor switch and the first diode, and
still another module housing the fourth semiconductor switch and the second diode; and
a conductor bar of a low inductance connecting the three modules.

4. The three-level inverter according to claim 1, wherein the first diode and the second diode are Schottky barrier diodes made of silicon carbide.

5. The three-level inverter according to claim 1, further including between the direct current power source and the series circuit of the first capacitor and second capacitor, a voltage fluctuation compensation circuit that stabilizes a voltage across the series circuit by compensating for a voltage fluctuation of the direct current power source.

6. The three-level inverter according to claim 1, further including
a first module housing the first semiconductor switch and the second semiconductor switch,
a second module housing the third semiconductor switch and the fourth semiconductor switch,
a third module housing the first diode and the second diode, and
a conductor bar of a low inductance connecting the first to third modules.

7. The three-level inverter according to claim 1, further including
one module housing the first semiconductor switch and the second semiconductor switch,
another module housing the third semiconductor switch, the first diode, the fourth semiconductor switch, and the second diode, and
a conductor bar of a low inductance connecting the one module and the other module.

8. A three-level inverter, comprising:
a first series circuit of a first semiconductor switch and a second semiconductor switch configured to control conduction/interruption of forward current when an on-signal or an off-signal is applied to a control terminal thereof, and which attain a conduction state for a reverse current, the first and second semiconductor switches of the first series circuit being connected together at a first series connection point, and connected in parallel to a direct current power source;
a second series circuit of a first capacitor and a second capacitor connected together at a second series connection point, and connected in parallel to the first series circuit, the second series circuit connected in parallel with the direct current power source;
a bidirectional switch configured to control conduction/interruption of both forward and reverse currents, a first end thereof being connected to the first series connection point, a second end thereof being connected to the second series connection point, the bidirectional switch further including:
a third semiconductor switch and a fourth semiconductor switch configured to control conduction/interruption of forward current when an on-signal or an off signal is applied to a control terminal thereof, and which attain one of a conduction state always for a reverse current, an interruption state always for the reverse current, or a non-conduction state having no breakdown voltage;
a first diode connected in series with the third semiconductor switch; and
a second diode connected in series with the fourth semiconductor switch,
the bidirectional switch including a series circuit of the third semiconductor switch and the first diode, and a series circuit of the fourth semiconductor switch and second diode, connected together in parallel,
the three-level inverter further including
a first module housing the first semiconductor switch and the second semiconductor switch,
at least one other module housing at least one of the third semiconductor switch, the first diode, the fourth semiconductor switch, and the second diode, and
a conductor bar of a low inductance connecting the first module and the at least one other module,
wherein the third semiconductor switch and the fourth semiconductor switch are IGBTs or MOSFETs made of silicon, and
the first diode and the second diode have a reverse recovery time equal to or shorter than a switching time of the first semiconductor switch and the second semiconductor switch.

9. The three-level inverter according to claim 8, the at least one other module including
a second module housing the third semiconductor switch and the first diode, and
a third module housing the fourth semiconductor switch and the second diode.

10. The three-level inverter according to claim 8, wherein the first semiconductor switch and the second semiconductor switch each include a semiconductor switching element made of silicon carbide, or each include a reverse parallel circuit of a semiconductor switching element made of silicon carbide and a Schottky barrier diode made of silicon carbide.

11. The three-level inverter according to claim 8, the at least one other module including
a module housing the third semiconductor switch, the first diode, the fourth semiconductor switch, and the second diode.

12. The three-level inverter according to claim 11, wherein the first diode and the second diode are Schottky barrier diodes made of silicon carbide.

13. The three-level inverter according to claim 8, further including: between the direct current power source and the series circuit of the first capacitor and second capacitor, a voltage fluctuation compensation circuit that stabilizes a voltage across the series circuit by compensating for a voltage fluctuation of the direct current power source.

14. The three-level inverter according to claim 8, the at least one other module including
a second module housing the third semiconductor switch and the fourth semiconductor switch, and
a third module housing the first diode and the second diode.

* * * * *